J. CLEMENTS.
FLOWER POT SUPPORT FOR JARDINIÈRES.
APPLICATION FILED OCT. 13, 1908.

910,905.

Patented Jan. 26, 1909.

Witnesses

Inventor
John Clements
By Joshua R. H. Potts
Attorney

UNITED STATES PATENT OFFICE.

JOHN CLEMENTS, OF PHILADELPHIA, PENNSYLVANIA.

FLOWER-POT SUPPORT FOR JARDINIÈRES.

No. 910,905.  Specification of Letters Patent.  Patented Jan. 26, 1909.

Application filed October 13, 1908. Serial No. 457,481.

*To all whom it may concern:*

Be it known that I, JOHN CLEMENTS, a citizen of the United States, residing at Philadelphia, in the county of Philadelphia and State of Pennsylvania, have invented certain new and useful Improvements in Flower-Pot Supports for Jardinières, of which the following is a specification.

This invention relates to certain new and useful improvements in flower pot supports for jardinières, the object being to provide a support for holding a flower pot in a jardinière in such manner that moisture shall be supplied to the roots of the plant, but the plant supported out of contact with the water so as to prevent the roots from becoming decayed by standing in the water.

Another object of my invention is to provide a support which shall allow free circulation of air through the same so that the water in the bottom of the jardinière and lower part of the support will be taken up by the air and carried into the flower pot through the opening thereof, and furthermore, to provide a support facilitating the vaporization of the water and its being taken up by the air.

Another object of the invention is to provide a support which shall indicate how much water is needed and whether the water has fallen below the required level.

These objects are attained by the novel arrangement and construction of parts hereinafter fully described and shown in the accompanying drawings, wherein—

Figure 1:
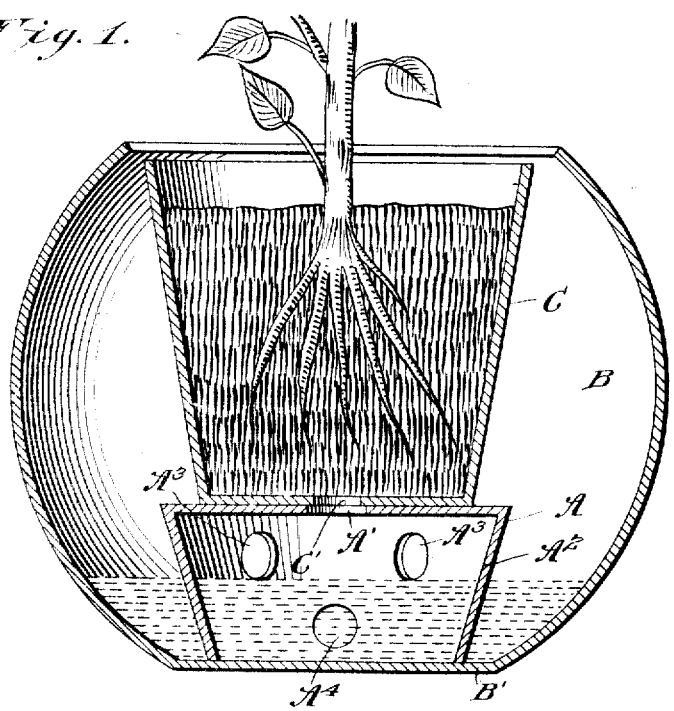
Figure 2:
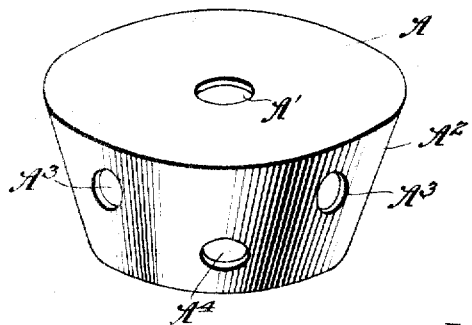

Figure 1, is a vertical section through a jardinière, flower pot and the support therefor. Fig. 2, is a perspective view of my improved support.

My improved support A is preferably made of terra cotta or like somewhat porous material and is formed of a flat circular plate which has a downwardly and inwardly inclined wall $A^2$ extending entirely around the plate. An opening $A'$ is formed at the center of the top plate, which opening is intended to coincide with the usual opening in the bottom of a flower pot. The contracted wall $A^2$ is provided with two series of openings, one series $A^3$ for the passage of air being located near the top of the support, and the other $A^4$ for the passage of water being placed relatively near the bottom edge of the wall. There is no bottom to the support, the wall $A^2$ resting directly upon the bottom of the jardinière. Preferably I provide four openings $A^3$ in the upper series and two openings in the lower series located vertically between the upper openings.

The support is especially adapted to be used in connection with jardinières and for this reason the inwardly contracted wall of the support conforms somewhat to the bulging sides of the jardinière B shown in the drawings as of an ordinary type. Jardinières have usually a relatively small bottom B' and the contracted lower end of the support A permits the support to have solid rest upon the small bottom, while the enlarged top provides a wide surface for the bottom of the pot C.

In use the flower pot is placed upon the support so that the central opening $C'$ registers with the opening $A'$ shown in Fig. 1. Water is then poured into the jardinière until it rises to a level just below the upper series of openings $A^3$. By this means the roots of the plant are kept above the water and out of contact therewith at all times, while at the same time air will circulate through the upper series of openings $A^3$, and will collect moisture in the interior of the support above the water. The peculiar arrangement of the openings $A^4$ provides for a draft or circulation of the moisture-laden air up through the flower pot, while permitting at times the moisture-laden air to pass out through the openings $A^3$ and upward around the outside of the pot to the foliage of the plant.

The use of the upper air openings $A^3$ as well as the lower openings is absolutely necessary for a successful provision of moisture to the plant. Without the upper openings no circulation of air will take place and therefore moisture cannot be carried upward through the opening $A'$. Another advantage due to the two series of openings is that they act as guides indicating the extent to which the jardinière should be filled and also indicating when the water has evaporated to a degree requiring that more be supplied. Thus the water should never extend up higher than a level just below the upper range of openings and never be allowed to sink below the lower range of openings, hence the openings will indicate just the amount of water necessary when the jardinière is filled.

If the rule above stated is followed, the plant will get precisely the proper amount of moisture, the roots will never come in contact with the water and the plant will thrive. It may also be stated that the porous nature of the support, if it be made of clay or other porous material aids very materially in the production of moisture-laden air as the porosity of the support tends to draw the water upward and allow it to be evaporated by the air within the support and exterior thereto. It provides a constantly dampened surface from which the water is constantly being evaporated.

Having thus described my invention what I claim as new and desire to secure by Letters Patent is:

A flower pot support comprising a flat top provided with a central opening, an annular inwardly tapering wall depending from the edge thereof, said wall provided with an annular series of openings near its lower edge and with another annular series of openings above and spaced from the first series.

In testimony whereof I have signed my name to this specification in the presence of two subscribing witnesses.

JOHN CLEMENTS.

Witnesses:
R. H. KRENKEL,
J. A. L. MULHALL.